July 19, 1966 P. S. SWARTZ 3,262,024

SUPERCONDUCTIVE DEVICE

Filed Nov. 2, 1961 3 Sheets-Sheet 1

Inventor:
Paul S. Swartz,
by Paul R. Webb, II
His Attorney.

SUPERCONDUCTIVE DEVICE

Filed Nov. 2, 1961 3 Sheets-Sheet 2

Inventor:
Paul S. Swartz,
by Paul R. Webb, II
His Attorney.

SUPERCONDUCTIVE DEVICE

Filed Nov. 2, 1961 3 Sheets-Sheet 3

Inventor:
Paul S. Swartz,
by Paul R. Webb, II
His Attorney.

United States Patent Office 3,262,024
Patented July 19, 1966

3,262,024

SUPERCONDUCTIVE DEVICE

Paul S. Swartz, Schenectady, N.Y., assignor to General Electric Company, a corporation of New York Filed Nov. 2, 1961, Ser. No. 149,591
3 Claims. (Cl. 317—158)

This invention relates to superconductive devices and to apparatus and to methods for producing such devices and more particularly to high field superconductive devices with a magnetic field confined within an aperture therein.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in generators, direct current motors and low frequency transformers, and to advances in cryogenics which removed many of the economic and scientific problems involved in extremely low temperature operations.

As is well known, superconduction is a term describing the type of electrical current conduction existing in certain materials cooled below a critical temperature, $T_c$, where resistance to the flow of current is essentially nonexistent. A high field superconductive body is a body with a superconducting phase which remains superconducting in a magnetic field greater than the critical magnetic field of that phase in homogeneous, unstrained bulk form.

The small amount of superconducting current and contemporaneous trapped magnetic flux which can be obtained within a superconducting body has been responsible to some degree for the lack of their use. The applied magnetic field to which a superconductive body is subjected begins to penetrate the skin or surface of the body and immediately creates a supercurrent which precludes the further penetration of the body. This is known as the Meissner effect. The London theory and verifying experiments demonstrated that an applied magnetic field induces currents to flow in a gross superconductor which decreased in magnitude from the outside toward the inside of the body. The result has been that the flux penetration depth and the depth to which the induced superconducting currents flow in a given superconductive material is given in terms of the London penetration depth $\lambda$. However, since the penetration depth $\lambda$ is exceedingly small, for example, less than about 1000 A. in most materials, it has not been possible to increase the quantity of penetrating magnetic flux in gross superconductive bodies. An increase in the magnitude of the applied magnetic field does not extend the limit, since this limit is fixed at the critical field, $H_c$, which results in the creation of a critical current density, $J_c$, in the surface of the superconductor and drives it normally resistive, or non-superconducting.

It has been found that high field superconductive bodies possess higher critical fields, $H_c$, than homogeneous, unstrained bulk superconductive bodies and available evidence increasingly supports the proposition that the higher critical fields, and therefore higher current densities, are manifestations of the microstructure in hard superconductive bodies. Specifically, the magnetic properties of high field superconductors are felt to inhere from what may be described as a fine filamentary mesh which pervades the bodies. Such a mesh provides connectivity that has an extremely high multiplicity. It has been shown that filaments which are thinner than the penetration depth in a gross superconductive body will remain superconductive in the presence of externally applied magnetic fields which exceed the critical field of the gross superconductive body. The filamentary mesh provides a plurality of current paths which enable larger currents to flow losslessly in the bodies and raise the critical current density, $J_c$.

It would be desirable to provide a high field superconductive device with a magnetic field confined substantially within an aperture in the device. It would also be advantageous to provide apparatus and methods for producing such high field superconducting devices.

It is an object of my invention to provide apparatus for producing high field superconductive devices.

It is another object of my invention to provide a method of producing high field superconductive devices.

It is a further object of my invention to provide a high field superconductive device.

It is a still further object of my invention to provide a high field superconductive device with a magnetic field confined substantially within an aperture in the device.

In carrying out my invention in one form, a high field superconductive device comprises a solid high field superconductive body having an aperture therethrough, a magnetic field generally parallel to the axis of the aperture confined substantially within the aperture of the body, and means to maintain the temperature of the body below its critical temperature.

These and various other objects, features, and advantages of the invention will be better understood from the following description taken in connection with the accompanying drawing in which.

Figure 1:
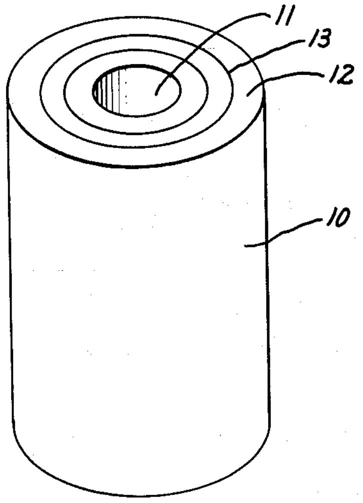
FIGURE 1 is a perspective view of a solid high field superconductive body.
Figure 2:
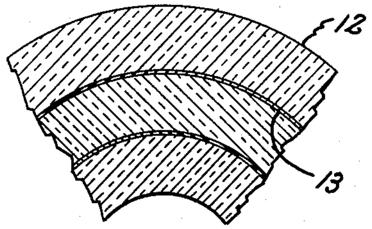
FIGURE 2 is a fragmentary, transverse sectional view of the body shown in FIGURE 1.

In FIGURES 1 and 2 of the drawing, a solid hard superconductive body 10 is shown having a central aperture 11 therethrough. Body 10 comprises a plurality of nonsuperconductive layers 12 between which are positioned thin, continuous films 13 of a superconductive metal or alloy. For example, layers 12 are ceramic material while films 13 are thin. A thin film is defined as a film whose thickness, D, is less than the superconducting penetration depth, $\lambda$.

Figure 3:
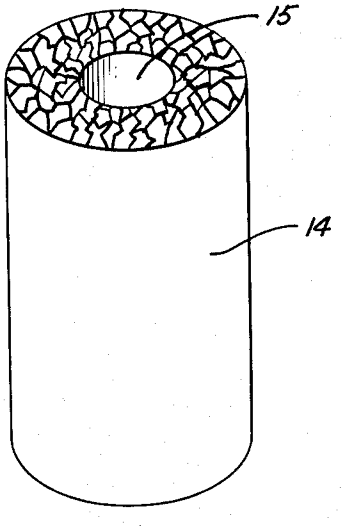
FIGURE 3 is a perspective view of another solid high field superconductive body including a superconductive filamentary network.
Figure 4:
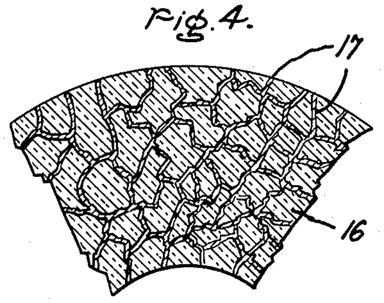
FIGURE 4 is a fragmentary, transverse sectional view of the body shown in FIGURE 3.

In FIGURES 3 and 4 of the drawing, a solid high field superconductive body 14 is shown having a central aperture 15 therethrough. For example, a superconductive matrix 16 has a filamentary network 17 filled with a superconductive material. Additionally, such a high field superconductive body can comprise a non-superconducting metallic or porous ceramic matrix with a filamentary network of a superconductive material therein. For example, mercury is employed in the filamentary network of a porous ceramic matrix.

Figure 5:
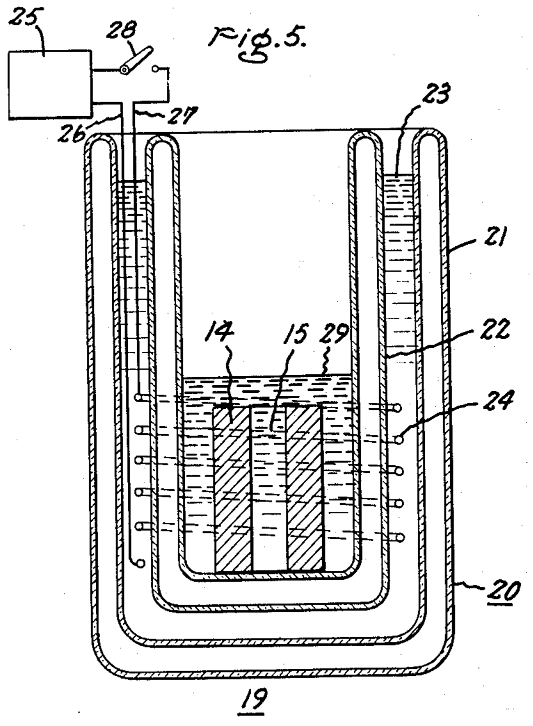
FIGURE 5 is a sectional view of the apparatus and device embodying my invention.

In FIGURE 5, apparatus is shown generally at 19 for producing a superconductive device which comprises an insulated container 20 having an outer insulated vessel 21 and an inner insulated vessel 22 separated by liquid nitrogen 23. For example, a solid superconductive body 14 consisting of consolidated partially reacted columbium and tin powders to form a continuous filamentary network of $Cb_3Sn$ and having an aperture 15 therethrough of the type shown in FIGURE 3 of the drawing is positioned within inner insulated vessel 22 and on the bottom thereof. A solenoid 24 is positioned in the liquid nitrogen 23 in vessel 21 to surround body 14 and is connected to a power source 25 by means of leads 26 and 27. A switch 28 is provided in lead 27 between solenoid 24 and power source 25 to energize and de-energize solenoid 24 to provide a magnetic field generally parallel to the axis of aperture 15 or at a slight angle thereto and within body 14 and aperture 15. Liquid helium 29 is poured into vessel 22 to immerse body 14 to cool the body below its critical temperature, $T_c$. If desired, solenoid 24 can be made of a superconductive material and positioned directly in liquid helium 29 to surround body 14.

Figures 6, 7, 8, 9:
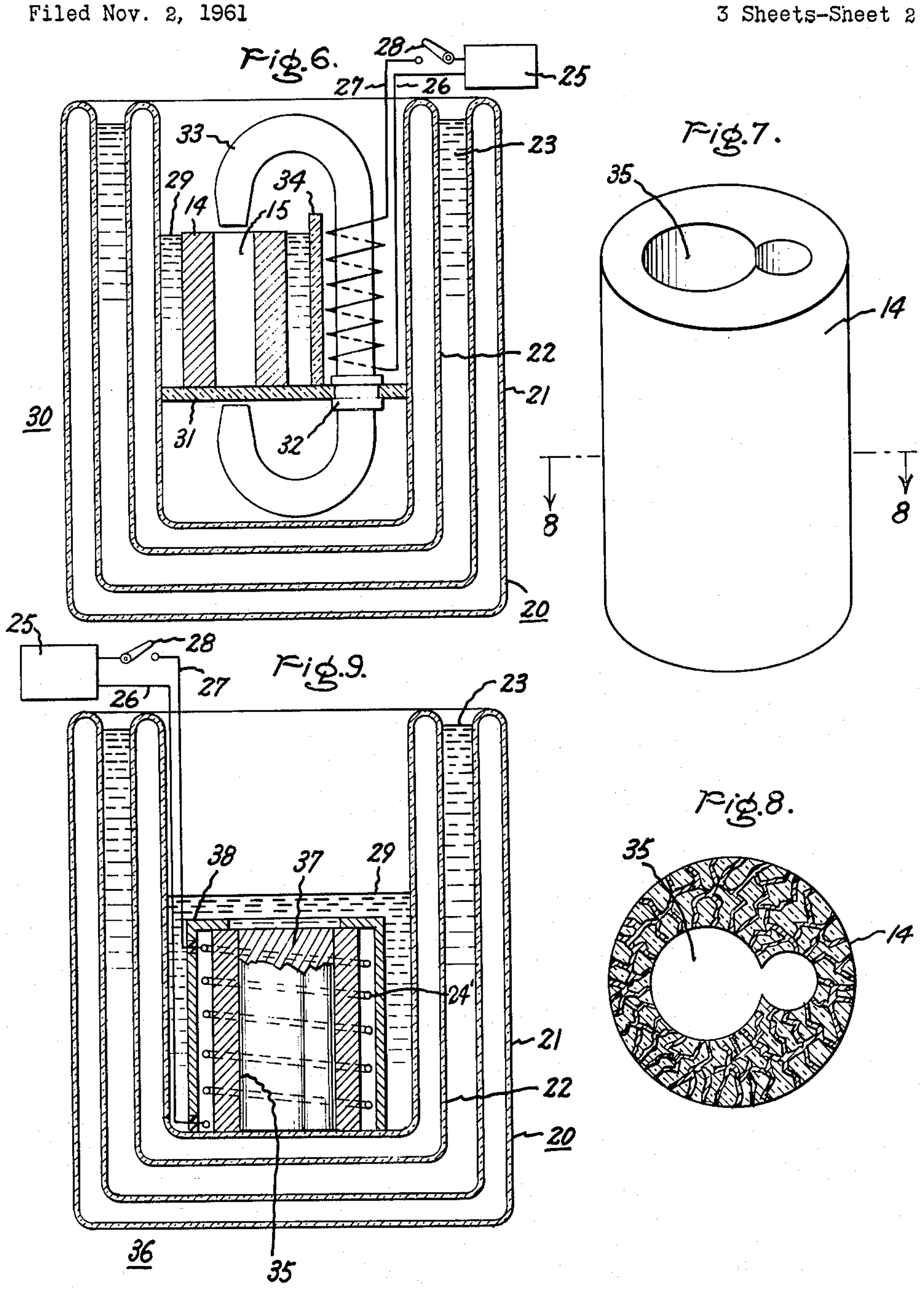
FIGURE 6 is a sectional view of a modified apparatus and device embodying my invention.
FIGURE 7 is a perspective view of a solid high field modified superconductive body.
FIGURE 8 is a sectional view taken on line 8—8 of the body shown in FIGURE 7.
FIGURE 9 is a sectional view of a further modified apparatus.

In FIGURE 6 of the drawing, a modified apparatus 30 is shown for producing a superconductive device which comprises an insulated container 20 having an outer insulated vessel 21 and an inner insulated vessel 22 separated by liquid nitrogen 23. An insulated support member 31 is mounted on the inner wall of inner vessel 22 to provide a support for superconductive body 14 positioned thereon and to provide a bottom wall to contain liquid helium 29 around and in contact with body 14 to cool the body below its critical temperature, $T_c$. A bracket 32 is positioned in member 31 to pivotally support an electromagnet 33. An insulated wall 34 surrounds electromagnet 33. A power source 25 is connected to electromagnet 33 by means of leads 26 and 27 therebetween. A switch 28 is provided in lead 27 to energize and de-energize electromagnet 33 to produce a magnetic field generally parallel to the axis of aperture 15 and within body 14 and aperture 15.

In the operation of the apparatus shown in FIGURES 5 and 6, superconductive body 14 having an aperture 15 therethrough is positioned within inner insulated vessel 22 of insulated container 20. In FIGURE 5, body 14 is placed on the bottom of inner vessel 22 and in FIGURE 6, body 14 is placed on support member 31. In FIGURE 5, a solenoid 24 is positioned in vessel 21 in liquid nitrogen 23 to surround body 14 while in FIGURE 6 electromagnet 33 is positioned to surround the open ends of aperture 15. Switch 28 is closed in the respective apparatus shown in FIGURES 5 and 6 to energize solenoid 24 and electromagnet 33 to produce a magnetic field generally parallel to the axis of aperture 15 and within both body 14 and its aperture 15. Liquid helium 29 is poured into the respective vessels 22 to contact body 14 to cool the body from above to below its critical temperature, $T_c$. As body 14 is cooled below its critical temperature, the body becomes superconducting. When body 14 has become completely superconductive, the magnetic field which is parallel to the axis of the aperture and within the aperture is confined substantially therein. Switch 28 is then opened to de-energize solenoid 24 or electromagnet 33 whereupon the applied magnetic field is terminated. The confined magnetic field within aperture 15 remains therein.

Solenoid 24 can be removed from vessel 21 or left in position while electromagnet 33 is positioned away from aperture 15 in body 14 to a position adjacent the inner wall of vessel 22 to produce a superconductive device. Such device comprises a solid superconductive body 14 having an aperture 15 therethrough, a magnetic field parallel to the axis of aperture 15 confined substantially within aperture 15, and a coolant in the form of liquid helium 29 within vessel 22 of container 20 contacting body 14 to maintain the temperature of the body below its critical temperature.

FIGURES 7 and 8 disclose a further modified solid high field superconductive body similar to the body disclosed in FIGURE 3 but including an aperture 35 in the form of a figure eight extending through the body. Such a body can be employed in the apparatus disclosed in FIGURE 5 or FIGURE 6 to produce a high field superconductive device.

In FIGURE 9 a further modified apparatus 36 is shown for producing a high field superconductive device which comprises an insulated container 20 having an outer insulated vessel 21 and an inner insulated vessel 22 separated by liquid nitrogen 23. For example, a high field superconductive body or tube 14 having a figure eight aperture 35 therethrough of the type shown in FIGURES 7 and 8 of the drawing is positioned within inner insulated vessel 22 and on the bottom thereof. A solenoid 24′ of superconducting material surrounds the exterior wall of body 14 and is connected to a power source 25 by means of leads 26 and 27. A magnetic core 37, such as soft iron, of figure eight configuration is positioned in aperture 35. A switch 28 is provided in lead 27 between solenoid 24 and power source 25 to energize and de-energize solenoid 24 to provide a magnetic field and thereby magnetize core 37 within aperture 35 which is parallel to the axis of the aperture. A magnetic housing 38, such as soft iron, surrounds solenoid 24. Magnetic flux lines pass through housing 38 from the north pole to the south pole of core 37. Liquid helium 29 is poured into vessel 22 to immerse body 14, solenoid 24′, core 37 and housing 38 therein to cool body 14 below its critical temperature.

Figure 10:
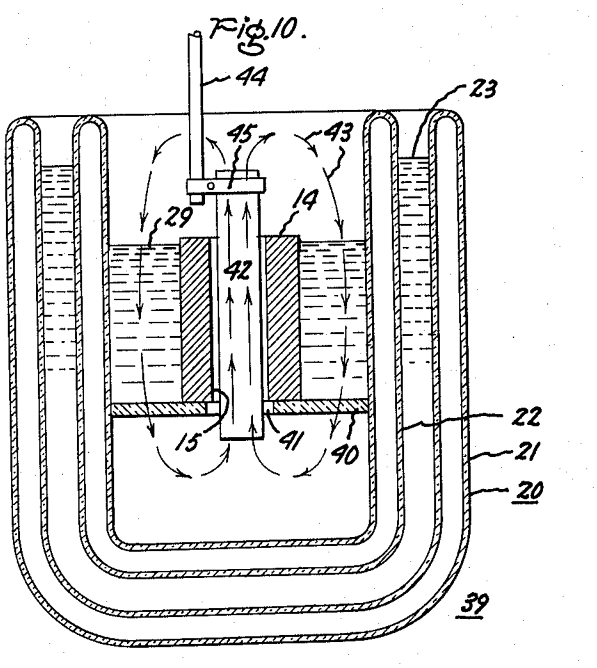
FIGURE 10 is a sectional view of a further modified apparatus.

In FIGURE 10, a further modified apparatus 39 is shown for producing a high field superconductive device which comprises an insulated container 20 having an outer insulated vessel 21 and an inner insulated vessel 22 separated by liquid nitrogen 23. An insulated support member 40 having a central aperture 41 therein is mounted on the inner wall of inner vessel 22 to provide support for a high field superconductive body 14 of the type shown in FIGURE 3 of the drawing, positioned thereon and to provide a bottom wall to contain liquid helium 29 around and in contact with exterior wall of body 14. A permanent magnet 42 is positioned within aperture 15 of body 14 and extends sufficiently beyond the ends of body 14 so that only a very small fraction of the field lines identified by directional arrows 43 on the outside of magnet 42 going from the north pole to the south pole intercept the area defined by the outer cross-section of body 14. A rod 44 is attached to the top of magnet 42 by means of a band 45. Rod 44 can be operated manually or automatically to position magnet 42 within aperture 15 of body 14 and withdraw the magnet therefrom. While magnet 42 is in position within aperture 15, liquid helium is poured into vessel 22 to immerse body 14 to cool the body below its critical temperature. A magnetic field is produced in magnet 42 within aperture 15 which field is generally parallel to the axis of the aperture.

Figure 11:
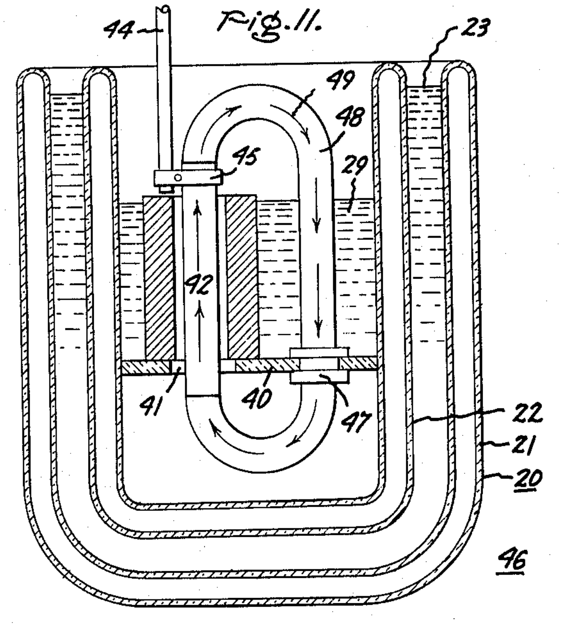
FIGURE 11 is a sectional view of a still further modified apparatus.

In FIGURE 11, a further modified apparatus 46 is shown for producing a high field superconductive device which includes generally the apparatus of FIGURE 10. Additionally, a bracket 47 is positioned in support member 40 to pivotally support a curved or horseshoe-shaped magnetic body 48. After rod 44 with its band has moved permanent magnet 42 in position extending through aperture 15 of body 14, magnetic body 48 is pivoted from a position adjacent the inner wall of vessel 22 to a position whereby each of its ends is adjacent an end of magnet 42. A magnetic field is produced in magnet 42 within aperture 15 which field is parallel to the axis of the aperture. The flux lines shown by arrows 49 emanating from the north pole of magnet 42 are returned to the south pole of magnet 42 through magnetic body 48. In this manner the flux lines do not intercept the outer cross-section of tube 14. Liquid helium is poured into vessel 22 to surround body 14 to cool the body below its critical temperature.

In the operation of the apparatus shown in FIGURES 9, 10, and 11, superconductive body 14 having an aperture therethrough is positioned within inner insulated vessel 22 of insulated container 20. In FIGURE 9, body 14 which has a figure eight apertures 35 is placed on the bottom of inner vessel 22. In FIGURES 10 and 11, body 14 is placed on a support member 40 having an aperture 41 therein. A solenoid 24 and a magnetic core 37 are employed in FIGURE 9 to produce a magnetic field parallel to the axis of aperture 35 and within core 37 of this aperture. Switch 28 is closed to energize solenoid 24 to provide a magnetic field and thereby magnetize core 37. The magnetic flux lines from both fields are returned through outer magnetic housing 38. In FIGURES 10 and 11, a magnetic field is created in magnet 42 within aperture 15 of body 14 by positioning permanent magnet 42 within the aperture. A rod 44 which is attached to magnet 42 by means of band 45 can be operated manually or automatically to position or withdraw the magnet. Magnet 42 extends beyond both ends of aperture 15 so that only a very small fraction of the field lines identified by arrows 43 intercept the area defined by the outer cross-section of body 14. In FIGURE 11, a curved magnetic body 48 is pivoted whereby each of its ends is adjacent to an end of magnet 42. In this manner, the flux lines pass through magnetic body 48.

After a magnetic field which is generally parallel to the axis of the aperture has been produced in core 37, or magnet 42, within the aperture of the superconductive body in each of the above figures, liquid helium 29 is poured into the respective vessels 22 to surround body 14. In this manner, the body is cooled below its critical temperature, $T_c$, to become superconducting. When the body has become completely superconductive, switch 28 in FIGURE 9 is then opened to de-energize solenoid 24. Magnetic core 37 is then removed from aperture 35 in the body while solenoid 24 and outer magnetic housing 38 can also be removed. In FIGURE 10, rod 44 is moved slowly upwardly to withdraw permanent magnet 42 from aperture 15 of body 14. In FIGURE 11, magnetic body 48 is pivoted away from magnet 42. Thereafter, magnet 42 is withdrawn slowly from aperture 15 by means of its rod 44. The magnetic field parallel to the axis of the body aperture which was produced by solenoid 24 and core 37 or magnet 42 is confined substantially within the aperture by superconducting body 14 maintained below its critical temperature.

Thus, a solid high field superconductive device is provided in FIGURES 9, 10 and 11 which comprises a high field superconductive body or tube having an aperture therethrough positioned within an insulated container, a magnetic field generally parallel to the axis of the aperture confined substantially within the aperture of the body, and a coolant within the container contacting the exterior wall of the body to maintain the temperature of the body below its critical temperature.

Several examples of methods of producing high field superconducting devices in accordance with the present invention are as follows:

A solid high field superconductive body with a figure eight aperture of the type shown in FIGURE 7 was produced by hydrostatically pressing columbium and tin powders with an atomic ratio of three columbium to one tin into a compact rod at a pressure of 100,000 pounds per square inch. The rod was sintered in vacuum at 850° C. for sixteen hours. After sintering, the rod was machined into a tube having a figure eight aperture. The tube had an outside diameter of about one inch and a length of about 0.9 inch. The two holes of the figure eight aperture were 0.500 inch diameter and 0.12 inch diameter, respectively. Apparatus of the type shown generally in FIGURE 5 was employed with the above high field superconductive body. Table I sets forth below the confined magnetic field strength produced in the aperture of the body by the solenoid and confined therein after the body had been cooled below its critical temperature by liquid helium.

*Table I*

Confined field strength (oersteds):
455
1115
1555
1560
1630

The temperature of the body was maintained below its critical temperature to provide a superconductive device. The applied magnetic field was terminated.

The same high field superconductive body was employed in apparatus of the type shown generally in FIGURE 9. A magnetic housing surrounded the solenoid positioned adjacent the exterior wall of the superconductive body. A magnetic soft iron core of figure eight configuration was positioned within the figure eight aperture of the body. Table II sets forth below the confined magnetic field produced in the aperture by the solenoid and by the magnetic coil and confined therein after the body has been cooled below its critical temperature by liquid helium and the core has been removed therefrom.

*Table II*

Confined field strength (oersteds):
850
1880
4480
8840

The temperature of the body was maintained below its critical temperature to provide a superconductive device. The applied magnetic field was terminated and the figure eight magnetic core was removed.

The same high field superconductive body was employed in the apparatus of the type shown generally in FIGURE 10. A permanent magnet was employed to produce an initial magnetic field which was confined within the aperture when the body was cooled to and maintained below its critical temperature. Table III sets forth below the confined magnetic field strength produced in the body aperture.

*Table III*

Confined field strength (oersteds):
1635
6440
6450

Another solid high field superconductive body was produced in the same manner as the previous body with the exception that the compact was sintered for two hours rather than 16 hours. Table IV sets forth the magnetic field strength produced in aperture of this body by magnets. Examples 1, 2 and 3 employ generally the apparatus shown in FIGURE 10 including a permanent magnet. Example 4 employs an Alnico magnet in such an apparatus. Example 5 employs generally the apparatus of FIGURE 11 including a permanent magnet and a curved magnetic body. Examples 6, 7 and 8 employ in such apparatus a fine particle magnet with a curved magnetic body.

*Table IV*

| Example: | Confined field strength (oersteds) |
|---|---|
| 1 | 490 |
| 2 | 1645 |
| 3 | 1970 |
| 4 | 6020 |
| 5 | 1785 |
| 6 | 4070 |
| 7 | 2880 |
| 8 | 4670 |

In each of the above examples, the aperture provides a region in which material can be placed before or after the magnetic field has been confined therein to subject the material to this field. If it is desired, the material, for example, in the form of a body or gaseous plasma can be surrounded by a thermally insulated container within the field so that the material can be subjected to a temperature different from the temperature of the superconductive body and controlled by external means.

While other modifications of this invention and variations in the method which may be employed within the scope of the invention have not been described, the invention is intended to include such that may be embraced within the following claims.

What I claim as new and desire to secure by Letters Patent of the United States is:

1. An apparatus comprising a solid high field superconductive body having an aperture therethrough, a permanent magnet positioned in the aperture of said body producing a magnetic field generally parallel to the axis of said aperture within said aperture, and means to cool said body below its critical temperature.

2. An apparatus comprising a solid high field superconductive body having an aperture therethrough, a permanent magnet positioned in the aperture of said body producing a magnetic field generally parallel to the axis of said aperture within said aperture, a magnetic body having each of its ends adjacent to an end of said first permanent magnet adapted to provide an external magnetic circuit, and means to cool said body below its critical temperature.

3. An apparatus comprising a solid high field superconductive body having an aperture therethrough, a solenoid surrounding the exterior wall of said body and a magnetic core positioned in the aperture of said body to produce a magnetic field generally parallel to the axis of said aperture within said aperture, a magnetic body surrounding said solenoid adapted to provide an external magnetic circuit, and means to cool said body below its critical temperature.

References Cited by the Examiner

UNITED STATES PATENTS

| | | | |
|---|---|---|---|
| 2,916,615 | 12/1959 | Lundburg | 340—173.1 |
| 2,946,030 | 7/1960 | Slade | 336—155 |
| 3,156,850 | 11/1964 | Walters. | |

OTHER REFERENCES

Hewlett, C. W., General Electric Review, June 1946, pp. 19–25.

Bulletin of The American Physical Society, series II, vol. 5, No. 2, March 4, 1960, p. 111 (p. 6). QC–1–A58.

BERNARD A. GILHEANY, *Primary Examiner.*

JOHN F. BURNS, *Examiner.*

G. HARRIS, Jr., *Assistant Examiner.*